United States Patent [19]

Salajka et al.

[11] Patent Number: 4,898,847
[45] Date of Patent: Feb. 6, 1990

[54] CATALYST AND METHOD FOR PRODUCTION OF POLYMERS AND COPOLYMERS OF 1-ALKENES

[75] Inventors: Zdeněk Salajka; Odlřich Hamřik; Jan Kratochvíla; Mihnea Gheorghiu; Josef Křivánek, all of Brno; Pavel Šindelář, Prostějov; Petr Žaloudík, Brno; Vasil Legeza, Litvínov; Ladislav Jansa, Teplice, all of Czechoslovakia

[73] Assignee: Vyzkumny Ustav Makromolekularni Chemie, Brno, Czechoslovakia

[21] Appl. No.: 68,998

[22] Filed: Jul. 1, 1987

Related U.S. Application Data

[63] Continuation-in-part of Ser. No. 38,820, Apr. 15, 1987, abandoned.

[30] Foreign Application Priority Data

Jul. 3, 1986 [CS] Czechoslovakia ............... 5072-86
Aug. 22, 1986 [CS] Czechoslovakia ............... 7089-86
Dec. 23, 1986 [CS] Czechoslovakia ............... 9837-86

[51] Int. Cl.$^4$ .............................................. C08F 4/64
[52] U.S. Cl. ................................. 522/110; 502/108; 502/112; 502/115; 502/120; 502/132; 526/129; 526/151; 526/156

[58] Field of Search ............. 502/108, 110, 112, 115, 502/120, 132

[56] References Cited

U.S. PATENT DOCUMENTS

| 4,200,715 | 4/1980 | Lynch et al. ............... | 526/88 |
| 4,508,843 | 4/1985 | Etherton et al. ........... | 502/110 X |
| 4,578,374 | 3/1986 | Best ............................. | 502/120 X |
| 4,618,662 | 10/1986 | Nowlin ....................... | 502/115 X |

FOREIGN PATENT DOCUMENTS

51-25396  7/1976  Japan ................... 502/110

*Primary Examiner*—Patrick P. Garvin
*Attorney, Agent, or Firm*—Klein & Vibber

[57] ABSTRACT

The supported catalyst for the polymerization of 1-alkenes is obtained by a consecutive depositing on the insert inorganic oxide of silicium and/or aluminium at least one organic compound of aluminium, at least one compound of titanium and vanadium and at least one organic compound of aluminium and/or magnesium. It can be phlegmatized by 0.5–50% w/w of the paraffinic hydrocarbon having melting point 25–150° C., which is coated either together with active components of the catalyst or separately. The catalyst polymerize and copolymerize ethylene without any additional activation.

13 Claims, No Drawings

CATALYST AND METHOD FOR PRODUCTION OF POLYMERS AND COPOLYMERS OF 1-ALKENES

This application is a continuation-in-part of Ser. No. 038,820, filed Apr. 15, 1987 and now abandoned.

FIELD OF THE INVENTION

Ziegler catalysts for polymerization and copolymerization of 1-olefines may be divided into unsupported and supported ones. Supported catalysts are divided again into classes of catalysts where the support is formed either by chlorides of magnesium or aluminium and/or by metal oxides, especially by silica and alumina.

This invention deals with catalysts based on compounds of transition metals (titanium and vanadium) with silica and/or alumina as the support.

such catalyst are described in many patent publications, for example—U.S. Pat. No. 3,787,384; U.S. Pat. No. 4,063,009; U.S. Pat. No. 4,148,754; U.S. Pat. No. 4,173,547; and U.S. Pat. No. 4,302,566.

A disadvantage of this group of catalyst is that they need an additional activation by an organoaluminium compound immediately before polymerization or directly in the polymerization apparatus itself.

Recently, there is a tendency to develop supported catalysts which do not require additional activation.

such catalysts are described in patent publications U.S. Pat. No. 4,426,317; U.S. Pat. No. 4,435,520;

Another direction in development of the catalysts is a method for passivation of catalysts with a layer of paraffinic hydrocarbons with higher melting points. This modification of catalyst is described, for example, in patent applications: U.S. Pat. No. 4,200,715; FR 2,529,211; EP 102,895; and EP 159,736.

The catalyst according to this invention differs from known catalysts in that the layer of transition metal compounds is sandwiched on the support between two layers of organometallic compounds. The top layer of organic compounds of aluminium and/or magnesium modifies properties of transition metal compounds anchored on support impregnated by organoaluminium compounds in such a way that the catalyst is stable during storage and does not require additional activation in the polymerization.

DESCRIPTION OF THE PRIOR ART

Coordination catalysts for polymerization of 1-alkenes, known as Ziegler catalysts, are well established. Starting from the middle of the fifties, a great effort has been devoted to synthesis of the best catalysts, making possible a preparation of poly (1-alkenes) with defined structure and properties, a high yield and a good economy. Besides empirical search for new catalyst formulations, theoretical aspects of the polymerization reactions were studied, including their kinetics and mechanism. Despite of a great effort, the theory is not able to provide a procedure to synthesize suitable catalysts. It makes only possible to rationalize the information and catalysts of this type must be searched for, studied and developed empirically.

Many physical and chemical parameters affect directly preparation of the catalysts and the actual polymerization. Due to a great number of demanded polymer types and an enormous number of combinations of components used, it is very difficult to find an optimum catalyst for a given purpose. During a routine catalyst preparation, it is necessary to keep qualities of raw materials, prescribed ratios and concentrations, reaction conditions, sequence of components, reaction times and temperatures, and all these parameters must be found at first experimentally and then they must be compiled. Due to an unsatisfactory theoretical background, the volume of necessary experiments is immense and the progress is rather slow.

Effective catalytical systems capable to polymerize 1-alkenes at low temperatures and pressures have been developed, making possible to control molecular weights, the width of the molecular weight distributions and densities of polymers. In the case of polyethylene it is possible to produce, for example, by copolymerization at relatively low pressures, even low density types, produced until recently by a radical high pressure polymerization only. A procedure for production of some specific linear low density polyethylenes by polymerization in a reactor with a fluidized bed has been described by Karol et al in patent publication U.S. Pat. No. 4,302,566.

Catalytical systems based on transition metals of 4a and 5a groups of the periodic system of elements known until now polymerize ethylene readily, and due to suitable copolymerization parameters (comparing with previously used chromium-based catalysts), give copolymers of alkenes with a low unsaturation in the chain and a narrower molecular weight distribution, which is advantageous for some applications. Catalysts based on transition metals of 4a and 5a groups of the periodic system of elements demand an activation with an organometallic compound, which is mostly carried out additionally, either immediately before the polymerization or even in the polymerization reactor itself. The activation consists in alkylation of the transition metal and sometimes in its reduction. Disadvantages of these methods for production of the catalyst are: (1) a difficult control of a reduction degree of the transition metal (usually a deeper reduction takes place than desirable, and thus its activity decreases) and (2) a low stability of the catalysts (the activity decreases during storage spontaneously or by an action of impurities).

An activation of the catalyst in a polymerization reactor causes technological complications, as for example, the necessity to feed the components separately and proportionally. One of them is pyrophoric and this is hazardous considering the presence of large amounts of combustibles. In addition to this, a free organometallic compound catalyses oligomerization of 1-alkenes to low molecular weight oligomers. They form undesirable coatings on inner walls of an apparatus, especially in the case of solvent-free processes as it is the case of the gas-phase polymerization.

Catalytical systems of this type are described by Karol et al U.S. Pat. No. 4,302,566; Stevens et al in U.S. Pat. No. 3,787,384; Strobel et al U.S. Pat. No. 4,148,754; Zielgler et al U.S. Pat. No. 4,063,009; and particularly by Graff U.S. Pat. No. 4,173,547.

In recent years, there is a tendency to develop one-phase catalytical systems based on transition metals of 4a and 5a groups of the periodic system of elements. Using these catalysts for polymerization of 1-alkenes, complications with feeding of catalysts are eliminated, the coatings on walls of a polymerization apparatus are not formed and the obtained polymer has desired particle morphology. One-phase catalytical systems based on titanium and vanadium compounds were described, for example, in U.S. Pat. No.4,426,317 and U.S. Pat. No.

4,435,520. Rogers in U.S. Pat. No. 4,426,317 Aylward in U.S. Pat. No. 4,435,520 described supported catalysts obtained by a reaction of an inorganic oxide with organometals of the 3rd group of the periodic system of elements and then with some vanadium compounds.

It is known from the patent literature that highly reactive catalysts exist, being passivated against effects of water or oxygen by coating their surface with a layer of an inert solid substance, forming an effective diffusion barrier. These catalysts, however, must be in its active form during polymerization, the monomer diffusion to active sites must not be hindered. Therefore, the protective layer should be formed from a material with melting point between environmental temperature and polymerization temperature. In reality, higher saturated hydrocarbons and their mixtures can be used.

U.S. Pat. No. 4,200,715 describes a dispergation of a supported catalyst in a solid phase, obtained by mixing a paraffinic wax with a liquid, low molecular weight hydrocarbon. The catalyst modified in such a way is resistant against diffusion of impurities during its transport and storage. The dispergation is carried out with the finished catalyst only, the possibility to change chemical parameters of the catalyst during the stage of depositing catalytical constituents is not utilized. patent publication EP 159,736 describes a modification of an one-phase unsupported catalyst by coating it with a layer of a viscous mineral oil. In this case, however, the particle size distribution of the catalyst and also of the polymer formed is too broad in this particular unsupported catalyst and it is not possible to utilize it in the gas-phase polymerization.

It is also known that a protective layer can be formed on the catalyst surface by a prepolymerization of 1-alkenes. The prepolymerization with an aim of improving the activity of a catalyst was the subject matter of patent publication FR 2,529,211. An elimination of particle sticking was described in patent publication EP 102,895. The disadvantage of these catalysts is the use of $MgCl_2$ and $AlCl_3$ as a support, which contains an abundance of chloride ions and has an unsuitable particle size distribution. Now we have found a simple method for preparation of a new one-phase catalyst and a method for polymerization and copolymerization of ethylene using this catalyst.

SUMMARY OF THE INVENTION

The subject matter of this invention is a one-phase supported catalyst for polymerization of ethylene and its copolymerization with 1-alkenes having 3-10 carbon atoms, obtained by a consecutive deposition of at least one aluminium compound of general formula (I) $R_m AlX_{3-m}$ where m is 1-3, at least one compound of titanium of general formula (IIa) $R_n TiX_{4-n}$ where n is 0-4, and/or vanadium of general formula (IIb) $R_p VX_{5-p}$ or $R_q VX_{4-q}$ where p is 0-5, q is 0-4, and at least one organometallic compound of general formula III, which compound can be an organoaluminium compound identical with the compound of general formula I, and/or organomagnesium compound of general formula (IIIb) $R_r Mg X_{2-r}$ where r is 1-2 and R in all compounds I, II, III means alkyl, aryl, alkoxide with 1-20 carbon atoms, X means halogen or in compounds II one $X_2$ can be oxygen and the substituents R and X in compounds I, II, and III may be but need not be identical, on the support formed by silica and/or alumina with the specific surface 50-500 m$^2$/g, with 0.3-3 mmole of hydroxyl groups per one gram of the carrier and with the inner porosity 0.5-3 ml/g, with the particle sizes in the range of 1-200 um. The supported one-phase catalyst has the ratio of organoaluminium compounds I to the hydroxyl groups of the support in the range of 0.1-10, the mole ratio of transition metal compounds II to organoaluminium compounds I in the range 0.01-10 and the mole ratio of organometallic compounds III to transition metal compounds II 0.1-20. An advantageous execution of this invention is the supported one-phase catalyst in which the organoaluminium compounds I have alkyls with 1-8 carbons atoms, the transition metal compounds II are titanium tetrachloride, titanium tetraalkoxide, vanadium tetrachloride, vanadium tetraalkoxide and vanadium oxytrichloride, and the organomagnesium compounds III are dialkylmagnesium with 1-10 carbon atoms in alkyl groups.

A further subject matter of this invention is the method for production of this supported one-phase catalyst, in which depositions of compounds I, II, and III on the support are performed in a gas phase or a hydrocarbon solvent, and the supported one-phase catalyst as described before, which is coated with a paraffinic hydrocarbon having melting point in the range of 25°-150° C. in the amount of 0.5-100% w/w of the uncoated catalyst either separately or together with compound III, or on which linear and/or branched 1-alkenes with 2-10 carbon atoms are prepolymerized in the amount of 0.5-100% w/w of the uncoated catalyst. According to this invention, ethylene is polymerized or copolymerized with 1-alkenes having 3-10 carbon atoms using these catalysts at temperature 30°-300° C. and pressure of 0.1-250 MPa in slurry, gas phase or in fluidized bed containing 50-100 volume per cent of 1-alkenes and 0-50 volume per cent of hydrogen in the monomer mixture. Finally, the subject matter of this invention are the polymers of ethylene and its copolymers with 1-alkenes having 3-10 carbon atoms, produced using the catalysts and the method described above.

For the catalyst suitable to produce polymers and copolymers of ethylene according to this invention, an appropriate support is silica and/or alumina with specific surface 50-500 m$^2$/g, pore volume 0.5-3.0 ml/g, which has been dehydrated at temperatures 200°-950° C. by a stream of air or nitrogen in a fluidized bed for at least 4 hours. Silica and/or alumina treated in such a way contain 0.3-3.0 mmole of hydroxyl groups per one gram of support according to dehydration temperature.

Organoaluminium compounds I are chosen from compounds, such as trialkylaluminium, dialkylaluminiumhalogenide, alkylaluminiumdihalogenide, dialkylalkoxyaluminium, alkyldialkoxyaluminium, where alkyls are hydrocarbon groups with 1-20 carbon atoms and may be different within one compound. These organic compounds of aluminium have general formula (I) $R_m AlX_{3-m}$, where m is 1-3, R is branched or linear alkyl or alkoxide with 1-20 carbons, and all R groups can be (but not necessarily) identical, X is halogenide, preferentially chloride. These organometals are usually used as hydrocarbon solution at a concentration 5-25% w/w. For example, it is possible to use ethylaluminium dichloride, triethylaluminium, triisobutylaluminium, diethylaluminium ethoxide, tri-n-hexlaluminium and/or their mixtures. Using these compounds is economically advantageous, because they are produced on mass scale.

The reaction of organic compounds of aluminium $R_m AlX_{3-m}$ (I) with the surface of silica can be expressed by equations:

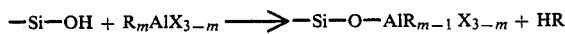

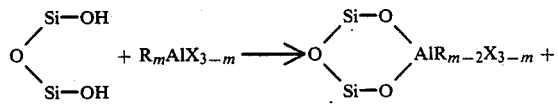

New chemical bonds Si—O—Al or Al—O—Al, if alumina is used, are formed, which assure a strong fixing of organoaluminium compound I on the surface. An ability of these structures to bond other compounds and to form active polymerization sites depends on density and type of these bonds and on specificities of substitutes of the anchored aluminium.

The mole ratio of the sum of all organic compounds of aluminium I to hydroxyl groups of the support is in a range of 0.1–10, advantageously 0.5–1.0. For a uniform deposition of organometals i, it is necessary to stir intensively a slurry of the support or a layer of the support. Temperature during the reaction can fluctuate in a broad range, depending on the vapor pressure of organometallic compound I and on boiling point of a hydrocarbon used as a solvent; the reaction can be carried out at 10°–70° C., advantageously at room temperature. Reaction time depends on the reactivity of organometals I, on their concentration and temperature; in reality, several tens of minutes are sufficient.

In a next step, at least one compound II of titanium and/or vanadium is deposited on the support with anchored organoaluminium compound I. they are selected from a group of halogenides, halogenalkoxides, alkyls, aryls, alkoxides, oxihalogenides of titanium and vanadium. For example, titanium tetrachloride, vanadium tetrachloride, vanadium oxytrichloride, tetraalkoxides of titanium and vanadium and mixtures of these compounds. The use of titanium and vanadium compounds in their highest oxidation state is preferred, vanadium compounds also in oxidation state +4. A small amount of compounds in a lower oxidation state (e.g. $Ti^{+3}$) is not detrimental. The most advantageous halogenide is chloride, but it is possible to use also other halogenides, e.g. bromides or iodides. It is possible to use, for example, ethoxide, isobutoxide etc. as alkoxides. The use of alkyl- and especially arylderivates of titanium and vanadium, e.g. methyl-titanium trichloride, tetrabenzyl titanium, benzyl-titanium trichloride, tetraphenyl-titanium, is possible, but it is economically less advantageous and a possible shortening of preparation time does not improve economy.

The reaction of compounds II with the modified support is advantageously made in a hydrocarbon medium or by a direct contact of titanium of vanadium compound II vapors with the solid phase of the intermediate product, preferentially at laboratory temperature. A strong anchoring of titanium or vanadium compounds on the support is achieved and they react with the fixed reaction products from the preceding step. Again, it is necessary to secure perfect stirring of the slurry to obtain a homogeneous product. The mole ratio of the sum of transition metal compounds II to sum of organoaluminium compounds I is kept in a range of 0.02–10, advantageously 0.05–1.

By chemical bonding of organometals I to the free hydroxyl groups of the support, a modification of their reduction capabilities and simultaneously their immobilization on the support surface are achieved. By the choice of ratio of organoaluminium compounds I to hydroxyl groups and ratio of organoaluminium compounds I to compounds of titanium and/or vanadium II, a formation of active sites on the support surface takes place, which are capable to polymerize 1-alkenes, either immediately, or after a reaction with another organometal compound.

Properties of an intermediate of the one-phase catalysts obtained in such a way are improved by depositing at least one further organoaluminium compound IIIa and/or organomagnesium compound IIIb chosen from trialkylaluminium, dialkylaluminium halogenide, alkylaluminiumdihalogenide, dialkylaluminium alkoxide, alkylaluminium dialkoxide, dialkylmagnesium or alkylmagnesium chloride, or their mixtures (III). Organoaluminium compounds IIIa used in this third step of preparation are chosen from the same group of organoaluminium compounds I, used in the first step of catalyst preparation. For example, it is possible to use ethylaluminium dichloride, diethylaluminium chloride, triisobutylaluminium, tri-n-hexylaluminium, diethylaluminium ethoxide, di-isobutylaluminium n-butoxide and their mixtures and the mixtures with organomagnesium compounds IIIb.

Organic compounds of magnesium IIIb for preparation of the catalyst have general formula (IIIb) $R_r Mg X_{2-r}$ where X is chloride, bromide or iodide and R is a hydrocarbon group containing 1–20 carbon atoms. Both R groups may be (but not necessarily) identical, they can be alkyls, cycloalkyls, aryls, alkenyls. Examples of suitable compounds IIIb are diisopropylmagnesium, dibutylmagnesium, diisobutylmagnesium, dihexylmagnesium, dioctylmagnesium, butyloctylmagnesium, dicyclohexylmagnesium, difenylmagnesium, ditolylmagnesium, ethylmagnesium chloride, butylmagnesiumm chloride. Organic magnesium compounds IIIb should not contain appreciable amounts of ethers. For choice of type of organic compounds of magnesium IIIb and aluminium IIIa and their ratios in mixtures (III), economic considerations applied (organomagnesium compounds are rather expensive and therefore it is advantageous to use only a necessary amount of these compounds). The mole ratios of organometallic compounds III to transition metal compounds II is kept in a range of 0.5–20, advantageously 1–8. Conditions and a depositing method for organometallic compounds III are similar as are those for deposition or the preceding components; again, it is necessary to secure a slow deposition and an intensive mixing.

During research and development of supported one-phase catalysts it was discovered surprisingly, that by depositing organoaluminium compound IIIa on the product of reactions of the support with constituents I and II, the polymerization activity of the obtained sandwiched catalyst is increased to values comparable with catalysts activated immediately before polymerization or in a polymerization reactor itself, and in some cases even better. Moreover, the mole ratio of organoaluminium compounds IIIa to transition metal compounds II is many times lower than that for two-phase catalysts. The supported one-phase catalysts with organoaluminium compounds IIIa as their third active constituent produce polymers with a high bulk density.

Similarly, it was found surprisingly, that an analogical effect can be obtained, using organomagnesium compounds IIIb. By their anchoring on the product of reactions of the support with constituents I and II, the supported one-phase catalysts are obtained, capable to polymerize 1-alkenes with a higher rate than two-phase catalysts activated immediately by an organometal before polymerization or in the polymerization reactor itself. Moreover, needed amounts of organomagnesium compounds IIIb as their third active constituents produce polymers with lower bulk densities than the comparable supported one-phase catalysts with organoaluminium compounds IIIa, but they polymerize with higher rates.

Therefore, it is advantageous to combine both organometals for obtaining desired properties of the catalyst and to deposit organoaluminium and organomagnesium compounds on the product of reactions of the support with constituents I and II in mixtures.

A majority of organomagnesium compounds IIIb and/or a part of organoaluminium compound IIIa are anchored on the surface of support particles and they do not diffuse inside the particles during the preparation and storage of the catalyst. This accumulation organomagnesium compound IIIb or possibly of a part of organoaluminium compound IIIa, on a periphery of the support particles influences positively stability of active sites against deactivating reactions of strong electron-donor compounds, which are usually contained in raw materials or can contact the catalyst during its preparation, storage and transport. During the polymerization, especially at higher temperatures, these organometals diffuse to transition metals compounds II and activate precursors of active sites.

Organoaluminium compound IIIa on one hand alkylates and/or reduces titanium and/or vanadium compounds II, and on the other hand it decreases the oligomerization ability of organomagnesium compound IIIb, increasing its mobility and its diffusion rate inside the catalyst particles to the fixed transition metals II. Formation of a transition metal species active in the polymerization is divided into two steps, i.e.: (i) a reaction of organometal I of the modified support with transition metal compound II and (ii) a product of this reaction reacts with organometallic compound III. Both reactions proceed under very mild, easily controllable conditions. Application of organometallic compounds II make possible to choose organometals I with low alkylating and reducing power, and to use them in necessary amounts. Thus, all compounds are exploited fully for formation of active polymerization sites and their protection against common amounts of impurities. Organometals III can be used in some surplus and can be exploited during polymerization, affecting positively its kinetics and maximum polymerization rate.

During all stages of preparation of the supported one-phase catalyst according to this invention, it is necessary to avoid an excess of compounds, such as water and oxygen, decomposing organometallic compounds. It is necessary to work in an inert atmosphere, e.g. under blanket of highly pure nitrogen or argon, containing less than 1 ppm of impurities. Hydrocarbon solvents used for preparation of the catalyst must be dried thoroughly, e.g. by distillation or rectification employing a principle of a higher volatility of water dissolved in hydrocarbons. Contents of impurities in media used for preparation of the supported one-phase catalyst must be checked systematically as well as purity of used vessels and fittings. The catalyst is stable and active in polymerization for a very long time, if vessels are perfectly tight during its preparation, storage, transport and feeding.

When a limited access of impurities can not be prevented, it is preferred for a long-term storage of the catalyst to coat its surface with a paraffinic hydrocarbon, and to blow the catalyst by highly pure nitrogen immediately before feeding it into the reactor.

Some properties of the catalyst are improved by coating a paraffinic hydrocarbon on the surface of catalyst particles. The paraffinic hydrocarbon must have its melting point between maximum usual environment temperature, at which the catalyst is produced, stored and transported, and polymerization temperature.

Advantageously, a paraffin with melting point 50°–70° C., an atactic polypropylene or other saturated hydrocarbons with suitable melting points can be used. The presence of multiple bonds and heteroatoms (i.e. elements other than carbon, hydrogen, and fluorine) in chains of paraffinic hydrocarbons is undesirable, because it decreases activity of the catalyst. Low molecular weight impurities of the electron-donor type also exhibit a negative influence. The paraffinic hydrocarbon can be deposited on the ready-to-use catalyst suspended in a hydrocarbon solvent, or simultaneously with the last catalyst constituent, it means with organic compound of aluminium and/or magnesium III. the paraffinic hydrocarbon is deposited in such a way, that its content is 0.5–100% w/w per catalyst, preferably 1–10% w/w. Principle of the beneficial behavior of the paraffinic hydrocarbon is coating of catalyst particles and prevention of diffusion of impurities to active sites during isolation, storage, transport and feeding of the catalyst. A formation of a diffusion barrier on the catalyst surface stabilizes further the catalytic system in the absence of monomer. Reactivity of catalyst components is decreased substantially and a majority of active sites are formed only after melting-off paraffinic hydrocarbon in a reactor.

Phlegmatization of catalyst particles according to this invention is not a necessary condition for obtaining an active catalyst. All aims of this invention can be also reached without deposition the paraffinic hydrocarbon. The paraffinic hydrocarbon confer a long-term storability and a resistance against impurities of the electron-donor type (water, oxygen) upon the catalyst and influences polymerization kinetics. Beside of methods for depositing the paraffinic hydrocarbon given above, it is possible to prepolymerize a low amount of 1-alkene, for example, ethylene, propylene, 1-butene, 4-methyl-1-pentene, 1-hexene, 1-octene, 1-decene or their mixture. 1-alkenes other than ethylene are prepolymerized preferentially, because more active sites are formed. Amount of the prepolymer obtained in such a way should be 0.5–50% w/w of the final catalyst, preferably 1–20% w/w.

By depositing catalytical constituents on the support in the sequence and amounts given above, a highly active polymerization catalyst is obtained, capable to polymerize ethylene and to copolymerize it with other 1-alkenes in a solvent or in a gas phase. If polymerization in a gas phase is carried out, it is necessary to evaporate solvent for obtaining a loose, free-flowing powder. A thorough drying is not necessary, because the powder flows freely even when it contains a content up to several tens of percents (w/w) of a solvent.

Size of the polymer particles is determined by the size of catalyst particles, but it is necessary to obey the procedure of depositing constituents according to this invention.

The support for the catalyst according to this invention is a porous fine-grained oxide, silica and/or alumina. Nature and properties of the support influence the catalyst activity and properties of the polymer.

The size of the support particles should be in the range of 1-200 um. The optimum size of particles can be found experimentally. A content of particles with diameter less than 10 um is disadvantageous, because polymer fines are formed, and a danger exists that large flakes (or even chunks) may be formed in a reactor and thick, deposits may appear in on-stream parts of the polymerization apparatus, plugging e.g. coolers of the recirculating gas. Silica or alumina are well known materials and commonly used as supports of polymerization catalyst. For this purpose, materials with a high specific surface (50-500 m$^2$/g) and a high pore volume (0.5-3.0 ml/g) are preferable. The particle size distribution of the support determines the particle size distribution of the catalyst and influences rheological properties of the polymer, the bulk density of the powder and thus the economy of its processing. The specific surface and the pore volume of support particles can be determined using BET method, described in paper: S. Brunauer, P. Emmett, E. Teller, *Journal of American Chemical Society* 60, p. 209-319 (1938).

Hydroxyl groups are present on the surface of silica or alumina and the groups can react with catalyst constituents. Water, absorbed physically, induces undesirable reactions and it is necessary to remove it. It is advantageous to remove water bonded physically by thermal activation of silica or alumina, with a slow removal of desorbed water. Activation temperature is chosen in a range of 200-950° C., preferentially 400-800° C. It is necessary to secure perfect stirring, thus, it is advantageous to perform activation in a fluidized bed. Silica and/or alumina is placed in a cool activation apparatus, then temperature is increased slowly to 200° C. while a stream of an inert gas is blown through the support or it is pumped-out. Thus, water vapors can leave without destroying structure of silica and/or alumina and condensing on cooler parts of the apparatus. Then it is possible to increase temperature quickly to a desired level without any problems.

Dehydration of silica and alumina is performed at a chosen temperature usually for at least 4 hours. Silica and alumina are cooled by a stream of nitrogen containing less than 1 ppm of water and oxygen. Dehydration temperature of the support must be chosen below the sintering temperature to prevent a destruction of the porous structure, a decrease of the specific surface and the pore volume. The amount of hydroxyl groups on the oxide support may be determined by any common method, e.g. by the reaction of the inorganic oxide with surplus of triethylaluminium, determining the amount of ethane released. One mole of ethane is formed per each mole of reactive hydroxyl groups in this reaction.

Due to high reactivity of compounds used and to a high heat effects of reactions, it is suitable to use organometallic compounds I and III and compounds of titanium and vanadium II in a diluted form, dissolved in suitable solvents. In general, it is possible to use aliphatic hydrocarbons with linear or branched chains, for example, butanes, pentanes, hexanes, oxtanes, and their mixtures, e.g. kerosene, gasoline as solvents. Usage of cyclic hydrocarbons, e.g. cyclopentane, methylcyclohexane, cyclohexane, as well as aromatic hydrocarbons, especially benzene, toluene, xylenes, is not excluded, but it is not economically advantageous.

In the first reaction step, i.e. reaction of silica and/or alumina with organoaluminium compound I in a liquid phase, it is advantageous to use organometal I diluted in such a way, that the total amount of solvent at least doubles the pore volume of the support. The reaction of organoaluminium compound I with the support is carried out preferably at room temperature, reaction time is in a range of several minutes to several hours, depending on reaction conditions. After the reaction of organometal I is brought to completion, the solvent may be, but not necessarily, removed by decantation, evaporation or evacuation. It is recommended to remove the solvent and wash-out the support with the deposited organometal I in case that organometal I was used in a surplus, which could produce in the next step a new microheterogenous phase, containing no silica or alumina as a support.

In the second step, compounds of titanium and/or vanadium or their mixture II are added slowly with stirring. Conditions are identical with those used in the first step, it is possible to use the same solvent and it is possible, though not necessary, to remove it after the reaction.

In the third step, at least one organoaluminium compound IIIa and/or organomagnesium compound IIIb is added to the slurry, obtained in the second step, alternatively together with a paraffinic hydrocarbon. Reaction conditions are similar to those used in the first step; it is advantageous to remove the solvent after reaction, for example, by decantation, by evacuation, or by evaporation with stirring etc. If the paraffinic hydrocarbon is deposited in the third step together with organoaluminium and/or organomagnesium compound III it is advantageous to work at higher temperatures, or to increase temperature in the final stage of the solvent evaporation, to secure a uniform coating of support particles with the paraffinic hydrocarbon.

The paraffinic hydrocarbon can be deposited also separately in the fourth preparation step, when the paraffinic hydrocarbon is added successively and evenly to the product of the third step, at temperature higher than melting point of the paraffinic hydrocarbon, as a melt or as a solution in a suitable hydrocarbon solvent. Alternatively, it is possible to mix a solid dispersed finely paraffinic hydrocarbon with the reaction product of the third step at a low temperature and then to increase the temperature slowly over the melting point of the paraffinic hydrocarbon. After cooling and possible drying of a surplus of the solvent, a loose, free-flowing powder of the supported one-phase catalyst can be obtained. All reactions leading to the catalyst can be carried out without a solvent in a gas phase, using a fluidized bed stirred mechanically or pneumatically. Organometals I and III and compounds of transition metal II can be deposited as vapors in a stream of an inert gas, for example, nitrogen or argon, or in a form of solutions in a hydrocarbon solvent; in the latter case it is necessary to keep conditions to prevent sticking of particles during the whole process of depositing the components. Particles remain unsticky even when they contain several tens of weight percents of a solvent; the exact value must be determined experimentally for particular conditions. Deposition of components I-III on silica and/or alumina from a gas phase is advantageous, but it is necessary to keep carefully suitable temperatures, concentrations, flow rates and reaction times, to prevent formation of undesirable large flakes and chunks.

The supported one-phase catalyst prepared by the method according to this invention is effective in polymerization without a necessity to activate it additionally before a polymerization or in the reactor itself. The polymerization activity of the catalyst does not change in a pure medium during storage at common temperatures. If the catalyst contains the paraffinic hydrocarbon, it is resistant also against a mild access of impurities during storage, transport and feeding of the catalyst. Taking into account that some access of impurities of the electron-donor type cannot be excluded, the phlegmatization by a paraffinic hydrocarbon is advantageous. A paraffinic hydrocarbon with melting point between maximum temperature of surroundings and the polymerization temperature can be prepared also by a pre-polymerization of a small amount of 1-alkenes, such as ethylene, propylene, 1-butene, 4-methyl-1-pantene, 1-hexene, and 1-octene. These monomers are contacted with the product of the third step under an intensive stirring, advantageously at increased temperatures (50°–100° C.), either in the hydrocarbon solvent after the third reaction step, or in a gas phase. Reaction time is dependent on the required amount of the prepolymer. It is advantageous to remove the unreacted monomer before cooling and drying the catalyst.

The catalyst prepared according to this invention can be used for homopolymerization of ethylene and for its copolymerization with propylene, 1-butene, 1-pentene, 4 methyl-1-pentene, 1-hexene, 1-octene and further 1-alkenes and their mixtures.

A polymerization of 1-alkenes using the one-phase catalyst according to this invention can be carried out in a fluidized bed, in a mechanically stirred layer in gas phase, in a solvent or in a liquid 1-alkene. Any liquid, which does not react with the catalytical system, and does not decrease its polymerization activity, can be used as a solvent. It is suitable to use aliphatic hydrocarbons with linear or branched chains, liquid under conditions of the polymerization, e.g. butanes, pentanes, hexanes, heptanes, their mixtures, distillation fraction of oil, e.g. petrol kerosene, diesel oil, or aromatic and cyclic hydrocarbons (benzene, toluene, xylenes, cycloalkanes) or chlorinated aliphatic or aromatic hydrocarbons. It is advantageous to polymerize in a liquid monomer (1-alkene) thus increasing the productivity of the reactor due to the absence of an inert diluent. Preferably, cheap aliphatic hydrocarbons of their mixtures are used as solvents. On the large scale, it is advantageous to polymerize in a fluidized bed, because it is not necessary to remove the solvent from the polymer.

The polymerization pressure may be atmospheric, or it can be higher, for example, up to 250 MPa. Preferably, it is polymerized at pressures 0.5–4 MPa. In the gas phase polymerization, pressures in a range of 1–3 MPa are the most economical. Higher pressures are advantageous for obtaining polymers with a very low content of the catalyst residues.

It is possible to polymerize discontinuously or more preferably, continuously. Feeding of the catalyst can be in charges or continuously in such an amount, to keep the concentration of transition metal in a range of 0.001–10 mmole/l, preferably 0.01–0.5 mmole/l.

Polymerizations may be carried out at 30°–300° C. At temperatures exceeding melting point of the polymer formed, it is possible to perform so-called solution polymerization in a solvent or the high pressure polymerization catalysed by the catalyst according to this invention.

In the gas-phase polymerization it is necessary to keep the temperature 5°–10° C. below the melting point of the polymer to prevent agglomerization of particles and formation of large flakes.

The molecular weight of polymers can be controlled by the content of comonomers, by the polymerization temperature and by the hydrogen feed. The absence of hydrogen and comonomer leads to formation of ultra-high-molecular weight polymers (UHMW PE).

The polymerization can be performed also in more stages, arranged in series or in parallel, where different conditions can be used: e.g. different catalyst compositions, temperatures, residence times, compositions of monomer mixtures, pressures, hydrogen concentrations etc. Thus, it is possible to prepare polymers with a broad molecular weight distribution, suitable for some applications. The polymers with a broad molecular weight distribution is advantageous to prepare in two or more stages, where different reaction conditions or different catalyst compositions are used, e.g. a different ratio titanium: vanadium or (aluminium and magnesium): (titanium and vanadium). By using a mixture of catalysts or a mixture of titanium and vanadium compounds within one catalyst, polymers with a broad molecular weight distribution can be obtained also in a single stage, because in this case active sites of different quality can coexist on the catalyst surface.

Spherical particles of the polymer are formed during the polymerization, replicating the shape of original particles of the catalyst and thus also that the support. The enlargement factor is 10–50 times. Compact particles are formed by polymerization with the diameter several tenths of a millimeter up to several millimeters, depending on the polymerization time (in the discontinuous process) or on the residence time (in the continuous process). The usual polymerization time is 0.5–8 hours, preferably 2–6 hours. At shorter polymerization times, the contents of ash and catalyst residues are higher, while the reactor productivity is high. On the contrary, at longer polymerization times the quality of the polymer improves and the reactor productivity decreases.

The catalyst is deactivated upon the discharge from the reactor by air, water vapor, or by carbon monoxide. Due to a low content of the catalyst residues, it is not necessary to wash them from the polymer.

The invention will be clarified by following examples, which do not limit the scope of the invention.

EXAMPLES

EXAMPLES 1–7

Into a reactor freed from water and oxygen, containing 50 ml of stripped n-heptane, 2.0 g of the support (silica and/or alumina) were poured under a blanket of pure nitrogen and organoaluminium compound I was added in the amounts according to Table 1. After 15 minutes of stirring at laboratory temperature, titanium and/or vanadium compound II was added (see Table 1), it was again stirred for 15 minutes and organic compound of aluminium and/or magnesium (III) according to Table 1 was added and it was stirred for further 15 minutes.

The last step of the catalyst preparation was a solvent removal by a stream of dry nitrogen or by evacuation. The catalysts, prepared in such a way are obtainable as dry powders, containing at most about 50% w/w of a solvent. Over this limit, a sticky powder or a paste are obtained, which can not be transported pneumatically and fed into the reactor without difficulties. If the polymerization is carried out in liquid phase, a slurry of the catalyst in a hydrocarbon can be fed directly into the polymerization reactor.

During preparation, storage, transport, and feeding of the catalyst, it is necessary to exclude an excess of catalytical poisons of the electron-donor type, for example oxygen, water, dienes, carbon oxides etc. All operations and manipulations with the catalyst must be carried out in an inert atmosphere, for example under blanket of pure nitrogen or argon, containing less then 10 ppm, preferably less than 1 ppm of impurities of the electron-donor type.

Example 8

Into a purified reactor containing 50 ml of stripped n-heptane, 2.0 g of the support (silica and/or alumina) were poured against the flow of pure nitrogen, and a measured amount of organoaluminium compound (I) according to Table 1 was added. After about 30 minutes of reaction at environmental temperature, an amount of compound of the transition metal II according to Table 1 was fed and the mixture was stirred for additional 30 minutes. Then the temperature was increased to 60°-80° C. and the organometallic compound or their mixture III was added according to Table 1. Finally, a paraffinic hydrocarbon with melting point 48°-50° C. was added in the amount according to Table 1. After its dissolution, the solvent was removed by evacuation under steady stirring. A loose powder was obtained, exhibiting similar mechanical properties as those of the original support.

Example 9

It was proceeded according to Example 8 with the following difference: instead of the paraffinic hydrocarbon a mixture of ethylene with 40% vol. of hydrogen was introduced in such a way to polymerize 50 mmole of ethylene into oligomers solid at environmental temperature. After finishing this prepolymerization, a majority of the solvent was removed to obtain a loose, free-flowing powder. The catalyst is unsticky at environmental temperature, resistant against a diffusion of impurities and storable before a polymerization for a virtually unlimited period of time.

Example 10

The procedure is identical as in Example 8 with the following difference: instead of the paraffinic hydrocarbon, 30 mmole of 1-butene with 10 mmole of hydrogen was added and the stirring at 60°-80° C. continued until 1-butene was polymerized totally. After the prepolymerization period, a majority of n-heptane was removed by blowing-through nitrogen and the one-phase supported catalyst was isolated, capable to polymerize 1-alkenes without a necessity of an additional activation by any further component.

Example 11

A glass reactor (volume 1 dm$^3$) was used equipped with a spiral stirrer making possible to mix powders thoroughly. It was dried by nitrogen and 300 g of a support, dehydrated for at least 6 hours at temperatures 200°-950° C. with a stream of nitrogen, was poured in and stirring was switched on. Nitrogen of a very high purity was introduced through a sintered glass to the bottom of a 80 cm$^3$ evaporator and bubbled through a solution of organoaluminium compound I or their mixtures in a hydrocarbon (hexane). After saturating with vapors of organoaluminium compound I, the nitrogen was introduced through the bottom of the glass reactor into the layer of the activated support. After consecutive evaporation of all solution of organoaluminium compound I, at least one transition metal compound II is poured into the evaporator, neat or as a solution in a hydrocarbon, and nitrogen is again bubbled through. Finally, at least one organoaluminium compound IIIa and/or organomagnesium compound IIIb or their mixture is dosed into the emptied evaporator and let to evaporate to completion. Evaporation can be facilitated by heating the evaporator. In some cases, especially when organomagnesium compounds IIIb are used, heating is necessary. It is advantageous to cool the reactor at the beginning of introduction of organoaluminium compound I, to remove reaction heat. Small increase of temperature of the reactor to 60°-100° C. is not detrimental. The reaction components I, II, and III can be fed as neat substances, but for safety reasons, their solutions in hydrocarbons are preferred. All handling of the activated support and constituent I-III must be carried out in a medium of a very high purity, advantageously under blanket of an inert gas (nitrogen, argon) containing less than 1 ppm of water, oxygen and other impurities. According to this procedure a white-to-beige free-flowing powder is obtained, which is suitable for polymerization in a gas phase without any additional activation. Data concerning the preparation are given in Table 1.

Example 12

The process was identical with example 8 except that instead of organomagnesium compound III, its mixture with a paraffin having melting point 48°-50° C. in a hydrocarbon was added. After about 1 hour of additional stirring, the solvent was evaporated by evacuation. A free-flowing powder was obtained. Data concerning its properties are given in Table 1.

The catalysts prepared according to Examples 1-12 are obtainable as dry, loose powders, containing a small amount of a low molecular weight solvent or a paraffinic hydrocarbon. The maximum amount of a low molecular weight fraction depends on a composition of the catalyst and on temperature and it can be determined easily for particular conditions.

The catalyst prepared according to Examples 8-12 are storable unlimitedly in common reservoir equipped with customary armatures. In case of an infiltration of impurities of the electron-donor type to the catalyst, it is necessary to blow a layer of the catalyst by highly pure nitrogen before polymerization, for preventing an access of impurities into the polymerization apparatus.

Example 13

A 1.5 dm$^3$ laboratory reactor, making possible to prepare 300 g of a polymer, was purged by a stream of 0.5 dm$^3$/min of high purity nitrogen for 16 hours, then it was pressurized at the polymerization temperature (60°-100° C.) 10 times by nitrogen to 2.0 MPa and finally washed out twice by ethylene. The reactor was thermostated to the polymerization temperature using a jacket. A mixture of monomers with hydrogen was introduced into the reactor. The polymerization was started by breaking a glass vial with 50-150 mg of a catalyst, prepared according to Examples 1-12.

The bed was fluidized by a mechanical stirring and the polymerization rate was measured from the consumption of the fed monomer mixture. After about 4 hours, the reactor was depressurized, opened and the polymer processed. All conditions of the polymerization are given in Table 2.

Example 14

In a 1.5 dm$^3$ laboratory reactor, n-hexane was stripped by a stream of nitrogen of very high purity in such a way, that more than 15% w/w of the hydrocarbon was evaporated. Then the reactor pressure was adjusted by feeding a monomer mixture at polymerization temperature (see Table 2). The polymerization was commenced by breaking a glass vial with the catalyst (as a powder or as a slurry in a hydrocarbon) and it was carried out 4 hours at constant temperature, pressure was composition of the monomer mixture. After opening the reactor, the polymer was isolated by evaporating the solvent and dried in vacuum oven.

Example 15

The powdery catalyst was fed by a feeding device, using overpressure of nitrogen, into a bottom part of a continuous pilot plant reactor. The polymerization took place in a fluidized bed, composed from a mixture of the powdery polymer and the catalyst, is kept fluidized by a stream of the monomer mixture. The velocity of the stream of the mixture was 3-6 times higher than the minimum velocity needed for fluidization. A steady state was kept, defined by pressure 1.8-2.0 MPa, temperature in a range of 70°-110° C. and mole ratios according to Table 2. The polymer produced was removed discontinously from the reactor depending on its production rate. Productivity of the reactor depends on residence time (between 2-8 hours), on efficiency of cooling of the recycling monomer mixture (given by design parameters) and on activity and concentration of the catalyst (direct proportionality).

These examples show that the process according to this invention allows production of homopolymers and copolymers of ethylene with high bulk density and suitable properties. The process for preparation of the catalyst and the polymerization itself are simple, without necessity to activate the catalyst additionally before feeding it into a reactor or in the polymerization reactor itself. Deposits and large flakes are not formed on walls of the reactor during the polymerization and a high bulk density of the polymerization bed assures high productivity of the polymerization. It is possible to prepare a polymer with desired properties by changing the composition of the one-phase catalyst, the process of its preparation and conditions of the polymerization. There are very many combinations of these possibilities.

The catalyst is stable and active in the polymerization for unlimited time when an access of impurities of the electron-donor type is prevented. In the case of paraffinic hydrocarbon deposited on the catalyst, its resistance against these impurities is increased extraordinarily.

Although the invention is described and illustrated with reference to a plurality of embodiments thereof, it is to be expressly understood that it is in no way limited to the disclosure of such preferred embodiments but is capable of numerous modifications within the scope of the appended claims.

TABLE 1

Composition of the catalysts

| Example No. | OH-group content mmole OH g support | Organometal I mmole I g support | Compound II mmole II g support | Organometal III mmole III g support | Paraffinic hydrocarbon g IV g support |
|---|---|---|---|---|---|
| 1 | 0.7 | AlEt$_2$Cl (0.5) | TiCl$_4$ (0.1) | BuMgOct (0.4) | — |
| 2 | 0.7 | AliBu$_3$ (0.5) | TiCl$_4$ (0.2) | BuMgOct (0.2) | — |
| 3 | 0.7 | AliBu$_3$ (0.7), AlEtCl$_2$ (0.3) | TiCl$_4$ (0.15) | AliBu$_3$ (0.2) | — |
| 4 | 0.8 | AlEt$_2$Cl (0.3), AliBu$_3$ (0.3) | TiCl$_4$ (0.1) | BuMgOct (0.2) | — |
| 5 | 1.9 | AlEt$_2$Cl (1.8) | TiCl$_4$ (0.1), VCl$_4$ (0.1) | AliBu$_3$ (0.5) | — |
| 6 | 0.75 | AlEt$_2$Cl (0.75) | TiCl$_4$ (0.03), VOCl$_3$ (0.05) | EtMgBu (0.1) | — |
| 7 | 0.8 | AlEt$_2$Cl (0.67) | TiCl$_4$ (0.16) | Et$_2$AlOEt (0.16) | — |
| 8 | 0.7 | AlEt$_2$Cl (0.5) | TiCl$_4$ (0.1) | BuMgOct (0.4) | 0.20 |
| 9 | 0.7 | AliBu$_3$ (0.5) | TiCl$_4$ (0.2) | BuMgOct (0.2) | 0.70 |
| 10 | 0.7 | AlEt$_2$Cl (0.5) | TiCl$_4$ (0.1) | BuMgOct (0.4) | 0.84 |
| 11 | 0.8 | AlEt$_3$ (0.4) | TiCl$_4$ (0.15) | EtMgBu (0.15) AliBu$_3$ (0.1) | — |
| 12 | 0.7 | AlEt$_2$Cl (0.67) | TiCl$_4$ (0.1) | BuMgOct (0.4) | 0.20 |

Notes:
1. Symbols: Et = ethyl; Bu = n-butyl; iBu = isobutyl; Oct = octyl.
2. Silica Davison 959 was used as a support with specific surface 250–300 m$^2$/g, the pore volume 1.6 ml/g, with maximum pore radius 11 nm, dehydrated 4 hours at 800° C. (Examples 1-3, 8 and 10), 600° C. (Examples 4 and 6) and 200° C. (Example 5). Alumina with specific volume 150 m$^2$/g, pore volume 1.0 ml/g with maximum pore radius 25 nm, dehydrated at 800° C. was used as a support in Example 7.

TABLE 2

Conditions of polymerisation and properties polymers

| Example No. | Temperature °C. | Partial pressure, MPa | | | Productivity kg polym. h × g Ti or V | Density kg/m | Bulk density kg/m$^3$ | MFI$_{2.3}$ | MFR | Particles size distribution, mm | | |
|---|---|---|---|---|---|---|---|---|---|---|---|---|
| | | H$_2$ | ethylene | 1-butene | | | | | | >0.5 | >0.2 to <0.5 | >0.1 to <0.2 |
| 1 | 90 | 0.02 | 1.8 | — | 80 | 960 | 340 | 0.06 | 36 | 91.2 | 8.5 | 0.3 |
| 2 | 90 | 0.04 | 1.8 | — | 37 | 960 | 350 | 0.11 | 50 | 92.6 | 7.1 | 0.3 |
| 3 | 80 | 0.05 | 1.75 | — | 19 | 960 | 360 | 0.26 | 56 | 92.1 | 7.7 | 0.2 |
| 4 | 90 | 0.01 | 1.85 | 0.03 | 120 | 935 | 300 | 0.22 | 36 | 91.3 | 8.6 | 0.1 |
| 5 | 90 | 0.02 | 1.7 | 0.08 | 23 | 925 | 310 | 0.15 | 35 | 93.7 | 6.2 | 0.2 |
| 6 | 90 | 0.02 | 1.75 | 0.025 | 136 | 940 | 320 | 0.28 | 36 | 94.3 | 5.6 | 0.1 |
| 7 | 100 | 0.015 | 1.8 | 0.025 | 30 | 940 | 300 | 0.30 | 32 | 93.7 | 6.0 | 0.3 |
| 8 | 90 | 0.02 | 1.8 | — | 105 | 960 | 345 | 0.10 | 35 | 91.8 | 8.1 | 0.1 |

TABLE 2-continued

| | | | | Conditions of polymerisation and properties polymers | | | | | | | |
|---|---|---|---|---|---|---|---|---|---|---|---|
| Example No. | Temperature °C. | Partial pressure, MPa | | | Productivity kg polym. h × g Ti or V | Density kg/m | Bulk density kg/m³ | MFI$_{2.3}$ | MFR | Particles size distribution, mm | | |
| | | H$_2$ | ethylene | 1-butene | | | | | | >0.5 | >0.2 to <0.5 | >0.1 to <0.2 |
| 9 | 90 | 0.04 | 1.8 | — | 45 | 960 | 360 | 0.15 | 45 | 91.4 | 8.0 | 0.5 |
| 10 | 90 | 0.02 | 1.8 | — | 95 | 960 | 350 | 0.15 | 38 | 92.3 | 7.5 | 0.2 |
| 11 | 90 | 0.02 | 1.8 | 0.08 | | 928 | 330 | 0.11 | 35 | 94.1 | 5.5 | 0.4 |
| 12 | 90 | 0.02 | 1.8 | — | 110 | 960 | 350 | 0.12 | 31 | 92.2 | 7.1 | 0.7 |

Notes:
MFI$_{2.3}$ = melt flow index at 190° C. and 2.3 kg load.
MFR = melt flow ratio at loads 2.3 kg and 23 kg, respectively.
Polymerizations with the catalyst prepared according to Examples 1–10 were effected according to Example 13; catalyst 11 according to Example 14; catalyst 12 according to Example 15.

We claim:

1. A supported one-phase catalyst for polymerizing ethylene and for copolymerizing ethylene with 1-alkenes containing from 3 to 10 carbon atoms prepared by the process comprising the combination of the following steps conducted in the recited order:

(I) first depositing under an inert atmosphere and fixing on a particulate support containing OH groups and formed of an oxide selected from the group consisting of silica and alumina, said support having a surface area in the range of 50 to 500 m²/g, an inner porosity in the range of 0.5 to 3.0 ml/g and particulate dimensions in the range of 1 to 200 microns; at least one organoaluminum compound having the empirical formula I:

$R_mAlX_{3-m}$ wherein m is an integer ranging from 1 to 3;

(II) then depositing at least one transition metal compound (I) of the group of titanium compounds having empirical formula IIa:

$R_nTiX_{4-n}$ (IIa)

wherein n is an integer ranging from 0 to 4; or vandium having the emprical formula IIb:

$R_pVX_{5-p}$ or $R_qVX_{4-q}$ (IIb)

wherein p is an integer ranging from 0 to 5 and q is an integer ranging from 0 to 4; and, finally depositing on the thus coated substrate at least one organometallic compound having the empirical formula IIIa wherein said compounds are organoaluminum compounds of formula I or organomagnesium compounds of formula IIIb:

$R_rMgX_{2-r}$ (IIIb)

wherein r is an integer ranging from 1 to 2, with the proviso that all said compounds of formulas I, II and III have substituents R being selected from those groups of substituents consisting of alkyl, aryl and alkoxide having from 1 to 20 carbon atoms; with X being halogen except that in compounds of formula II, X$_2$ can be oxygen and substituents R and X in compounds of formulas I, II, and III can be the same or different; said catalyst not requiring additional activation.

2. The catalyst of claim 1, wherein said support has a hydroxyl content of 0.3 to 3.0 millimoles of hydroxyl groups per gram.

3. The catalyst of claim 1 obtained by consecutively depositing on said support:
at least one compound of aluminum of general formula I $R_mAl X_{3-m}$ where m is 1-3; (I)

at least one compound of titanium of general formula IIa $R_nTi X_{4-n}$ where n is 0-4; (IIa)

and at least one organometallic compound of general formula III $R_mAlX_{3-m}$ where m is 1-3, which is of the same general formula of the organoaluminum compound of general formula I.

4. The supported one-phase catalyst according to claim 1 in which the mole ratio of organoaluminum compounds I to the hydroxyl groups of the support is in a range of 0.1–10, the mole ratio of the transition metal compounds II to the organoaluminum compounds I is in a range of 0.01–10 and the mole ratio of organometallic compounds III to the transition metal compounds II is in a range of 0.1–20.

5. A supported one-phase catalyst according to claim 1 wherein the alkyl moriety has one to 8 carbon atoms, the transition metal compounds IIa are titanium tetrachloride, titanium tetraalkoxide, the transition metal compounds IIb are selected from the group of vanadium tetrachloride, vanadium tetraalkoxide and vanadium oxtrichloride, and said organomagnesium compound IIIb is dialkylmagnesium with alkyl groups or one to 10 carbon atoms.

6. A method for making the supported one-phase catalyst according to claim 1, in which deposition of the compounds I, II, and III on the support is performed in a gas phase or in a hydrocarbon solvent.

7. The supported one-phase catalyst according to claim 1, coated together with compound III or separately with a parffinic hydrocarbon having a melting point in the range 25°–150° C. in an amount of 0.5–100% w/w of the uncoated catalyst.

8. The supported one-phase catalyst according to claim 1 on which a linear or branched 1-alkene with 2-10 carbon atoms is prepolymerized in the amount of 0.5–100% w/w of the catalyst.

9. A supported one-phase catalyst for the polymerization or copolymerization of ethylene with 1-alkenes having 3–10 carbon atoms obtained by consecutively depositing on a support:

at least one compound of aluminum of general formula I $R_mAl X_{3-m}$ where m is 1-3; (I)

at least one compound of vanadium of general formula IIb $$R_pVX_{5-p} \text{ or } R_qVX_{4-q} \quad \text{(IIb)}$$

where p is 0–5 and q is 0–4;
and at least one organometallic compound of general formula IIIb $$R_rMgX_{2-r} \text{ where r is 1-2;} \quad \text{(IIIb)}$$

said support consisting of silica and/or alumina with specific surface 50–500 m²/g, with 0.3–3.0 mole of hydroxyl groups per one gram, an inner porosity 0.5–3.0 ml/g and particle size ranging from 1 to 200 pm;

and R in all compounds I, ii, and III is alkyl, aryl, alkoxide with 1–20 carbon atoms, X is halogen but on compounds II one X$_2$ can be oxygen and substituents R and X in compounds I, II, and III can be the same or different.

10. The supported one-phase catalyst according to claim 9 in which the mole ration of organoaluminum compounds I to the hydroxyl groups of the support is in a range of 0.1–10, the mole ratio of the transition metal compounds II to the organoaluminum compounds I is in the range of 0.01–10 and the mole ratio of organometallic compounds III to the transition metal compounds II is in the range of 0.1–20.

11. The supported one-phase catalyst according to claim 3 in which organoaluminum compound I has alkyls with 1–8 carbon atoms, and said compounds IIa selected from the tetrachloride from the group of titanium and titanium tetraalkoxide.

12. The supported one-phase catalyst according to claim 9 in which said organoaluminum compound I has alkyls with 1–8 carbon atoms, in which said metal compounds IIb areselected from the group of vanadium, tetrachloride, vanadium tetraalkoxide and vanadium oxitrichloride, and said compound IIIb is dialkylmagnesium compound having alkyls having 1–10 carbons atoms.

13. The method for making the supported one-phase catalyst according to claim 9 where deposition of the compounds I, IIb and IIIb on the support is performed in a gas phase or in a hydrocarbon solvent.

* * * * *